United States Patent Office 3,312,505
Patented Apr. 4, 1967

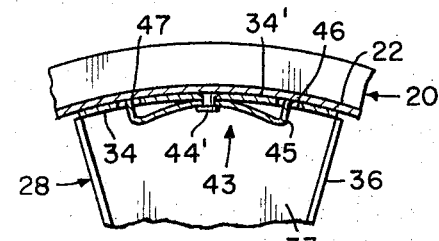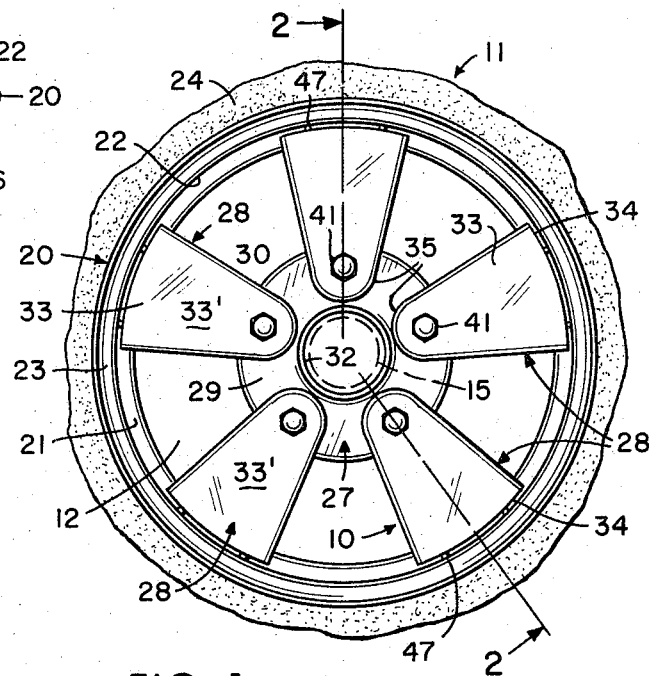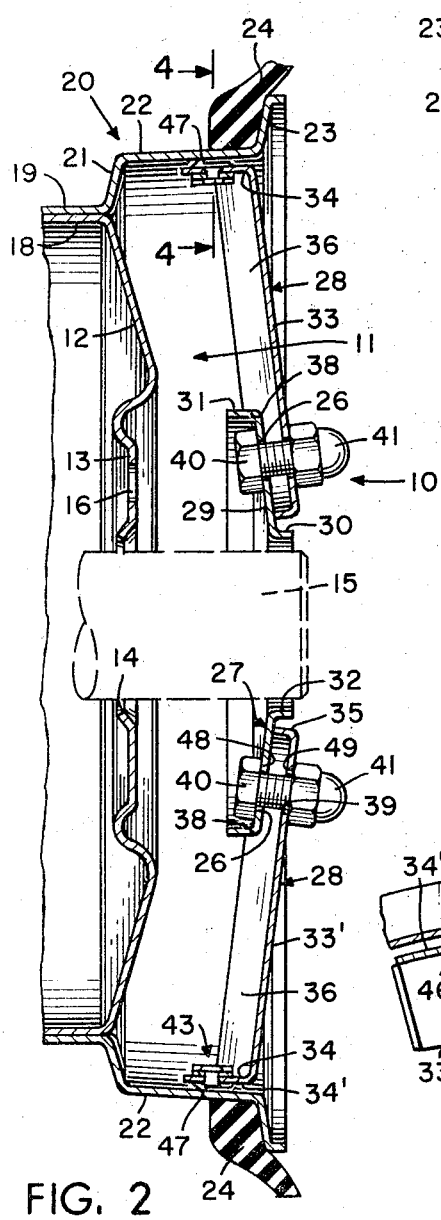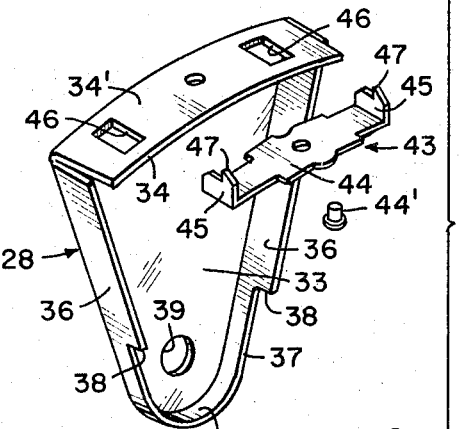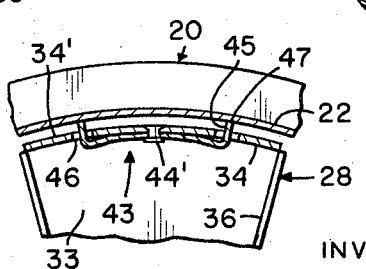

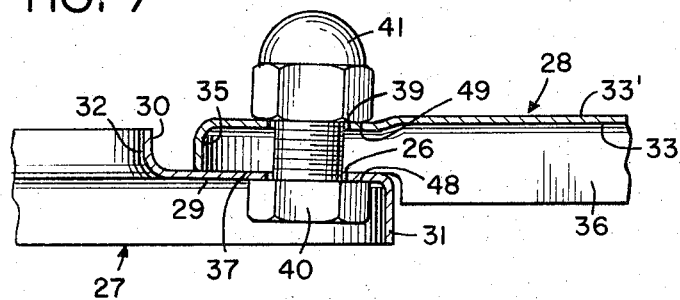
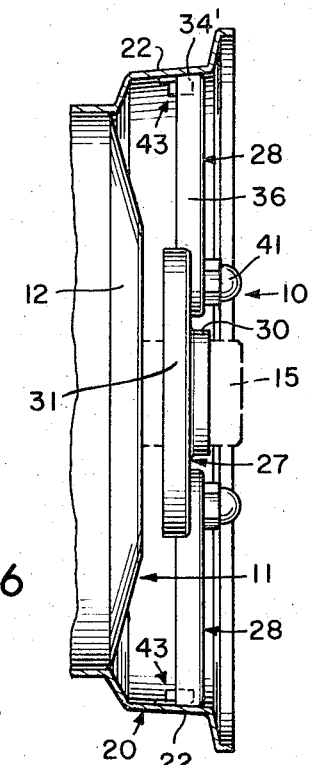
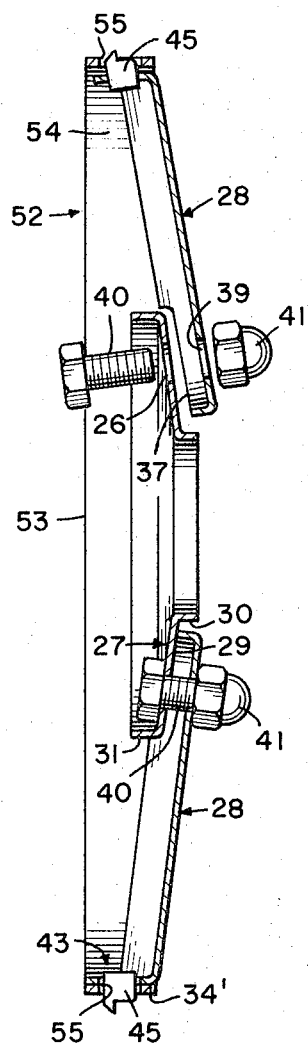
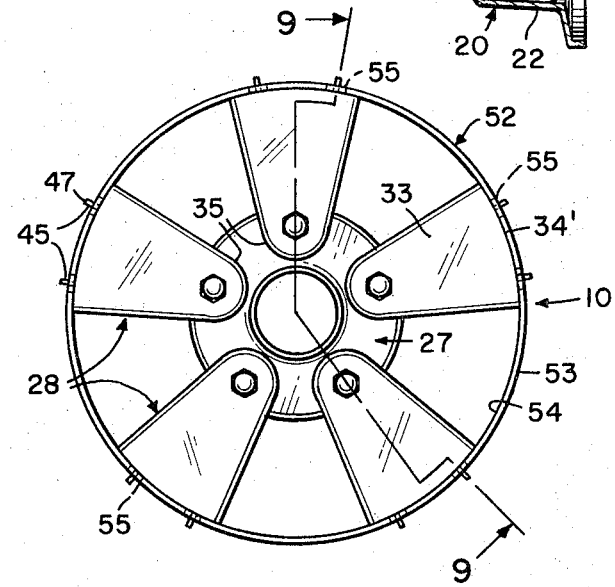

3,312,505
WHEEL COVER
William L. Hutchins, 2672 Addie Road,
Hazelwood, Mo. 63042
Filed Jan. 5, 1965, Ser. No. 423,444
6 Claims. (Cl. 301—37)

The present invention relates generally to improvements in wheel structures, and more particularly to ornamental cover members for the outer sides of vehicle wheels.

For many years there has been an increasing demand for wheel covering members applied to the outer sides of vehicle wheels to improve the ornamental appearance of the vehicle and enhance the value thereof. Today wheel covers are generally stamped from light gauge metal into an imperforate disk in a wide variety of patterns, or wheel covers are made to simulate the spoke or wire type wheels in which wire members are rigidly attached to hub and trim rings to form a unitary construction. The prior wheel cover constructions have been designed primarily for ornamentation, and in some cases as a means of providing a protective shield for the vehicle wheel to which it is attached.

A principal object of the present invention is to provide an ornamental vehicle wheel cover of substantial strength for structurally reinforcing the vehicle wheel.

Another object of the invention is to provide a wheel cover having interchangeable and replaceable spoke members formed from a standard die, thereby facilitating manufacture and economic repair in case of damage.

Another object of the invention is to provide a wheel cover of the press-on, pry-off type, and which increases its wheel gripping and supporting action during increased speeds of the vehicle and minimizes the chance for high speed throwing prevalent in other types of wheel covers.

Another object is to provide a wheel cover that is constructed to provide for easy and rapid assembly, rigidity and ruggedness in construction while providing a pleasing ornamental appearance.

These and still other objects and advantages of the present invention will become more readily apparent hereinafter.

Briefly, the present invention is embodied in a wheel cover comprising a hub member and a plurality of spoke members removably secured to the hub member and extending radially outwardly therefrom, each spoke member having yieldable wheel gripping means at its outer end.

The invention is also embodied in the parts and in the construction and arrangement of parts hereinafter disclosed and claimed. In the accompanying drawings, which form a part of this specification, and wherein like numerals refer to like parts wherever they occur:

FIG. 1 is a front elevational view of a wheel cover embodying the present invention, shown assembled on a vehicle wheel, FIG. 2 is an enlarged vertical cross-sectional view taken substantially along line 2—2 of FIG. 1, FIG. 3 is a greatly enlarged exploded perspective view of a spoke member of the wheel cover, FIG. 4 is a cross-sectional view taken substantially along line 4—4 of FIG. 2 and showing the gripping action of the spoke member with the wheel rim, FIG. 5 is a view similar to FIG. 4 showing the gripping action and spoke member to wheel rim relationship under high speed conditions of the vehicle, FIG. 6 is a cross-sectional view similar to FIG. 2, but showing a high speed condition of the wheel cover, FIG. 7 is a greatly enlarged fragmentary cross-sectional view showing a stressed condition of the wheel cover members under further high speed conditions of the vehicle, FIG. 8 is an elevational view showing a modified embodiment of the present invention, and FIG. 9 is a cross-sectional view taken along line 9—9 of FIG. 8, but showing the assembly of the FIG. 8 embodiment.

Referring now to the drawings and particularly FIGS. 1 and 2, it will be seen that a wheel cover 10 embodying the present invention is adapted for use on a vehicle wheel 11 having a generally radial disk wheel body 12 including a central annular and radially extending flange 13 having a central opening 14 to receive the hub 15 of a vehicle axle therethrough. A plurality of openings 16 are provided to receive the threaded bolts by which the wheel 11 is adapted to be attached in the usual manner to the axle flange over a brake drum of the vehicle. The wheel body 12 also has an outer peripheral and axially extending flange 18 to which the base flange 19 of an axially disposed multi-flanged tire rim 20 is rigidly attached. The tire rim includes a side flange 21 extending radially outwardly from the outer end of the base flange 19 and forming into a generally axially extending intermediate flange 22 from which a radially and axially outwardly curving terminal flange 23 is formed. A conventional tubeless tire 24 is adapted to be carried by the tire rim 20. It should be noted that in modern vehicle wheels the use of wider tread tires has required the provision of wider tire rims extending axially from the vehicle wheel body and resulting in a much deeper overhanging and radially unsupported portion.

The wheel cover 10 according to the present invention is designed to provide an exterior ornamental dressing for the vehicle wheel 11, and is also constructed of substantially heavier gauge steel (such as G A .065) and applied in a novel manner to the overhanging outer portion of the tire rim 20 to provide structural reinforcement thereto laterally of the disk wheel body 12, as will be described more fully hereinafter.

The wheel cover 10 includes an annular hub or base ring member 27 and a plurality of spoke members 28 removably secured to the hub member 27 and extending radially outwardly therefrom. The hub member 27 includes a frusto-conical surfaced central or annular wall 29 having relatively out-turned annular inner and outer flanges or rims 30 and 31, respectively, positioned in spaced apart axial planes. The annular inner flange 30 defines a central opening 32 adapted to freely receive the axle hub 15 therethrough, and the annular outer flange 31 defines the outer periphery of the hub member 27 and turns inwardly toward the vehicle wheel body 12 when the cover 10 is assembled thereon, FIG. 2. A plurality of bolt openings 26 are provided in the hub wall 29 for securing the spoke members 28 to the hub member 27.

Each of the spoke members 28 is formed with a main plate or wall 33 having an exterior or outer face 33' that may be plain, ribbed or embossed and finished in any suitable manner to form an ornamental or decorative appearance. The spoke members are also formed with a peripheral flange extending substantially normal to the main plate 33 and including an arcuate free end flange 34 complementary to the annulus curvature of the axial flange 22 of the tire rim 20, a rounded assembly end flange 35 and side margin flanges 36 extending along diverging lines from the assembly end 35 to the free end 34. The assembly end flange 35 and portions of the side margin flanges 36 adjacent thereto are relieved or cut out, at 37, to conform substantially to the configuration of the hub member wall 29 and outer flange 31, the cutout portion forming an abutment shoulder 38 on each side marginal flange 36 for engaging the annular outer flange 31 of the annular hub member at circumferentially spaced points thereby preventing relative pivoting motion of the spoke members on the hub member. An opening 39 is formed in the main plate 33 adjacent to the assembly end 35 of each of the spoke members.

The spoke members 28 each includes gripper means 43 carried at the radially outer free end flange 34 and adapted for engagement with the tire rim 20 to retain the wheel cover 10 in assembled position on the vehicle wheel 11. The gripping means 43 disclosed comprises a U-shaped spring member formed of relatively heavy gauge spring steel and including a central base portion 44 positioned on the interior side of the free end flange 34 of the spoke member and rigidly secured thereto by a rivet 44' or the like. The gripper means 43 also includes oppositely extending spring members having integrally formed spaced radially extending legs 45 and projecting outwardly through slots 46 formed in circumferentially spaced relation in the free end flanges 34 of the spoke members 28. The free end of the legs 45 are formed into gripper points 47. The gripper means 43 extending between the gripper points 47 and the central base portion 44 comprises a relatively strong spring locking device for engagement with the wheel rim 20.

The spoke members 28 are assembled on the hub member 27 by alignment of the openings 39 in the spoke members with the openings 26 in the hub wall 29, in which position the abutment shoulder 38 of each spoke member are engaged with the outer flange 31 of the hub member, and by inserting a bolt 40 through the aligned openings 26 and 39 and applying an acorn nut 41 or the like to rigidly, but releasably, secure the spoke member on the hub member by a single fastening means. It should be noted that the assembly end flange 35 of the spoke member spaces the main plate 33 in a predetermined spaced relation from the wall 29 of the hub member 27. This relationship facilitates radial movement of the spoke members 28 relative to the hub member 27 under extreme high speed conditions of the vehicle as will be described hereinafter.

When the spoke members 28 are secured to the hub member 27 by the bolt and nut fastening means 40, 41 so that the recessed marginal cutout of the assembly end flange 35 abuts the frusto-conical wall 29 of the hub member and the abutment shoulders 38 of the spoke members 28 engage the outer flange 31 of the hub member at circumferentially spaced points, the spoke members 28 are retained on the hub member 27 between the opposed substantially parallel surfaces 48 and 49 of the bolt head and acorn nut. The spoke members 28 extend radially outwardly from the hub member 27 at a predetermined angle, such as 6°, relative to a radial base plane taken through the hub member 27 or taken through the end flanges 34 of the spoke members 28.

The wheel cover 10 is assembled on the vehicle wheel 11 in a typical snap-on manner. The wheel cover 10 is positioned against the outer side of the vehicle wheel 11 with the central opening 32 of the hub member 27 aligned with the vehicle axle hub 15 and the gripper points 47 engaged against the tire rim 20. Application of axial force against the wheel cover 10 effects axial displacement of the wheel cover and loads the gripper means 43 to bias the gripper points 47 into firm engagement with the axial flange 22 of the tire rim 20, FIG. 4. In the assembled position as shown in FIGS. 1 and 2, the spoke members 28 extend radially to the hub member 27 at the predetermined angle presenting a conical appearance relative to a radial plane extending normal to the axis of the axle hub 15, the radial plane extending through the circumferential line on the tire rim flange 22 defined by the gripper point engagement therewith. The outer peripheral surfaces 34' of the end flanges 34 of the spoke members 28 are positioned in a circle having a diameter smaller than the diameter of the axial flange 22 whereby a predetermined clearance is provided between the tire rim 20 and each of the spoke members 28 in the normal assembled position of the wheel cover 10 on the vehicle wheel 11.

An important feature of the present wheel cover device is the angular relationship of the spoke members to a radial or vertical plane and the spacing of the outer peripheral surfaces 34' from the axial flange of the tire rim. This structural relationship causes the wheel cover 10 to flatten out during high speed opration of the vehicle thereby increasing the outer diameter of the spoke members whereby the spring tension of the gripper means 43 is increased and forces the gripper points 47 even more firmly into engagement with the axial flange 22 of the tire rim 20. This axial movement or flattening action of the hub ring 27 in response to high speed rotation of the vehicle wheel also brings the outer peripheral surfaces 34' of the spoke members 28 into contact with the axial flange 22 of the wheel rim thereby providing a reinforcement to the outer overhanging portion of the rim 20, FIG. 6. The locking action of the gripper means 43 with the rim 20 increase proportionately with the increase in vehicle speed and the spoke members come into abutting engagement with the tire rim 20 and are locked onto the vehicle wheel more tightly at 70 m.p.h. than at any lesser speed to thereby minimize the chance for high speed throwing of the wheel cover 10. At increasing high speeds above about 70 m.p.h. when the forces exerted on the wheel cover have caused the flattening action and the peripheral surface 34' of the spoke members are engaged with the tire rim 20, increased radial pressure of the spoke members against the tire rim is permitted by radial movement of the individual spokes relative to the center hub member 27, FIG. 7. The predetermined clearance defined by the spaced relation of the side wall 29 of the hub member 27 and the main wall 33 of the spoke members 28 permits a slight canting or rocking action of the bolts 40 providing additional radial expansion of the spoke members 28. In other words, surface-to-surface abutment of the spoke and hub members and snug engagement thereof between the bolt and nut head surfaces 48 and 49 would obviate the additional expansion feature of the wheel cover device as such assembly would then be completely rigid and similar to welding or riveting the two parts.

Referring now to FIGS. 8 and 9 wherein a modified embodiment of the wheel cover 10 is illustrated, it will be seen that an outer trim ring 52 may be provided as an additional ornamental feature of the wheel cover device. The trim ring comprises an annular band 53 formed of steel and having an inside surface 54 with a diameter slightly smaller than the outer diameter across the spoke members 28. The inside surface 54 of the trim ring is adapted to be positioned against and carried on the outer peripheral surfaces 34' of the spoke members 28 and spaced slots 55 are formed in the ring 52 to receive the legs 45 of the gripper means 43 therethrough. The outside diameter of the trim ring 52 will, of course, increase the outer diameter of the wheel cover 10, but it is smaller than the diameter of the axial flange 22 whereby the outer surface of the trim ring 52 will be moved into surface-to-surface contact with the axial flange during the flattening out action of the wheel cover at high speeds and before the spoke members have assumed a straight radial position. Accordingly, further flattening action will produce a more rigid reinforcement of the tire rim 20 by the wheel cover 10, and the trim ring 52 will greatly reduce or obviate the stress condition exerted on the bolt 40 during high speed rotation of the vehicle wheel at excessive speeds above 70 m.p.h.

Referring to FIG. 9, it will be seen that the wheel cover 10 is assembled with the trim ring 52 by inserting the legs 45 of the gripper means 43 into the slots 55 in the trim ring 52 and then tightening the fastening means 40, 41 to secure the spoke members 28 to the hub member 27. This tightening of the fastening means forces the flange cutout 37 of the spoke members outwardly over the wall 29 and outer flange 31 of the hub member 27 and also forces the outer peripheral surfaces 34' of the spoke members firmly against the inside surface 54 of the trim ring 52 and effecting a press fit therebetween. Accordingly, no further or additional fastening means is required between the trim ring 52 and the spoke members 28.

From the foregoing, it will be readily apparent that a novel wheel cover device 10 according to the present invention embodies the features disclosed and meets the objects outlined; the wheel cover 10 being ornamental in appearance, easily assembled and yet permitting selective removal of the spoke members 28 for replacement in case of damage or the like, and producing a reinforcement of the overhanging portion of the tire rim 20 while preventing throwing of the wheel cover device at high speed operation of the vehicle.

The specification is intended to cover all changes and modifications of the present invention that will be readily apparent to all skilled in the art, and the invention is limited only by the scope of the claims which follow.

What is claimed is:

1. A wheel cover comprising a hub member having a radially disposed frusto-conical surfaced wall formed at a predetermined angle to a base plane thereof and an axially disposed outer peripheral flange, and a plurality of spoke members having inner assembly ends and outer ends, each of said spoke members having a main wall and integral assembly end and side flanges formed to space the main wall from said frusto-conical surfaced wall and abut said peripheral flange at circumferentially spaced points, and said spoke members being removably secured to said hub member by single fastening means engaging said spaced main wall and frusto-conical surfaced wall, said spoke members extending radially outwardly from said hub member at said predetermined angle to the base plane of said frusto-conical surfaced wall of said hub member, and gripper means on the outer ends of said spoke members.

2. A wheel cover comprising a hub member having a radially disposed frusto-conical surfaced wall formed at a predetermined angle to a base plane thereof and an axially disposed outer peripheral flange, and a plurality of spoke members each of which includes a main wall with peripheral flange means and having an inner assembly end and an outer end, said peripheral flange means being relieved at said assembly end to form engagement and spaced abutment margins substantially complementary to said frusto-conical surfaced wall and peripheral flange of said hub member, the relieved peripheral flange means spacing said main wall of each spoke member from the frusto-conical surfaced hub member wall, and each spoke member being removably secured to said hub member by single fastening means engaging said spaced main wall and frusto-conical surfaced wall, said spoke members extending radially outwardly from said hub member at said predetermined angle to the base plane of said frusto-conical surfaced wall of said hub member, and gripper means on the outer ends of said spoke members.

3. A wheel cover comprising a substantially frusto-conical central hub member, the outer surface of which is formed at a predetermined angle to a base plane of said hub member, and a circumferential flange formed on the outer periphery of said hub member, and a plurality of separate spoke members each of which has a main wall and assembly end means, each of said end means being individually removably mounted on said hub member in contact with said outer surface and having an abutment shoulder adapted to engage said circumferential flange with said main wall being in spaced relation with said outer surface, said spoke members extending radially outwardly from said hub member at said predetermined angle and having outer ends disposed in a plane axially spaced from said assembly end means, and gripper means on the outer ends of said spoke members.

4. A wheel cover comprising a substantially frusto-conical central hub member, the outer surface of which is formed at a predetermined angle to a base plane of said hub member, and a circumferential flange formed on the outer periphery of said hub member, and a plurality of spoke members each of which has a main wall and assembly end means removably mounted on said hub member in contact with said outer surface and said circumferential flange with said wall main being in spaced relation with said outer surface, said spoke members extending radially outwardly from said hub member at said predetermined angle and having outer ends disposed in a plane axially spaced from said assembly end means, and gripper means on the outer ends of said spoke members, said gripper means being adapted to be yieldably engaged with an annular surface of a vehicle wheel rim at circumferentially spaced points and said outer ends of said spoke members being normally spaced radially inwardly from said annular surface, and said wheel cover being constructed and arranged to move in response to high speed rotation of the vehicle wheel into a substantially non-angular plane to increase the outer diameter and move the outer ends of said spoke members into contact with said annular surface of said vehicle wheel rim.

5. A wheel cover comprising a substantially frusto-conical central hub member, the outer surface of which is formed at a predetermined angle to a base plane of said hub member, and a circumferential flange formed on the outer periphery of said hub member, and a plurality of spoke members each of which has a main wall and assembly end means individually removably mounted on said hub member in contact with said outer surface and said circumferential flange with said main wall being in spaced relation with said outer surface, said spoke members extending radially outwardly from said hub member at said predetermined angle and having outer ends disposed in a plane axially spaced from said assembly end means, and gripper means on the outer ends of said spoke members, and including an annular trim ring means circumscribing the outer ends of said spoke members and being retained thereon solely by radial pressure of the spoke members resulting from the assembly of the spoke members on said hub member.

6. The wheel cover according to claim 5 in which said gripper means projects radially from the outer ends of said spoke members, and said trim ring means is provided with spaced slots to freely accommodate said gripper means therethrough.

References Cited by the Examiner
UNITED STATES PATENTS

| | | | |
|---|---|---|---|
| 1,959,255 | 5/1934 | Zerk | 301—37 |
| 2,712,474 | 7/1955 | Gaylord | 301—37 |
| 2,933,345 | 4/1960 | Lyon | 301—37 |

OTHER REFERENCES

Montgomery Ward, 1964 Fall and Winter Catalog, p. 1313.

National Catalog No. 64, pages 1 and 7 published by Namsco, Inc., Bellwood, Ill.

BENJAMIN HERSH, *Primary Examiner.*

RICHARD J. JOHNSON, *Examiner.*